United States Patent
Wong

(10) Patent No.: US 11,206,644 B2
(45) Date of Patent: *Dec. 21, 2021

(54) METHODS, APPARATUSES AND SYSTEM FOR TRANSMISSION OF A CONNECTION REQUEST MESSAGE IN A WIRELESS COMMUNICATIONS SYSTEM

(71) Applicant: Sony Corporation, Tokyo (JP)

(72) Inventor: Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/697,218

(22) Filed: Nov. 27, 2019

(65) Prior Publication Data

US 2020/0100244 A1 Mar. 26, 2020

Related U.S. Application Data

(63) Continuation of application No. 15/751,357, filed as application No. PCT/EP2016/069824 on Aug. 22, 2016, now Pat. No. 10,531,441.

(30) Foreign Application Priority Data

Sep. 25, 2015 (EP) .................... 15186988

(51) Int. Cl.
*H04W 72/04* (2009.01)
*H04W 76/10* (2018.01)
(Continued)

(52) U.S. Cl.
CPC ... *H04W 72/0413* (2013.01); *H04W 52/0229* (2013.01); *H04W 68/00* (2013.01);
(Continued)

(58) Field of Classification Search
None
See application file for complete search history.

(56) References Cited

U.S. PATENT DOCUMENTS 10,531,441 B2 * 1/2020 Wong .................. H04W 72/042
2010/0014468 A1 * 1/2010 Lee ........................ H04W 76/10
370/329

(Continued)

FOREIGN PATENT DOCUMENTS

| WO | 2007/052888 A1 | 5/2007 |
| WO | 2015/122665 A1 | 8/2015 |
| WO | 2017/050831 A1 | 3/2017 |

OTHER PUBLICATIONS

Rashid Attar, et al., "Enhancements to CDMA2000 1 x for M2M Communications", GC' 12 Workshop: Second International Workshop on Machine-to-Machine Communications 'Key' to the Future Internet of Things, 2012 IEEE, pp. 1675-1680.

(Continued)

*Primary Examiner* — Jutai Kao
(74) *Attorney, Agent, or Firm* — Xsensus LLP

(57) ABSTRACT

A terminal device for use in a wireless telecommunications system includes: a transceiver configured to perform wireless communication with a base station; and a controller configured to: control the transceiver to detect a wireless paging signal from the base station; detect whether the paging signal includes information defining an allocation of a communications resource for use by the terminal device to send a connection request message to the base station; control the transceiver, in response to a detection that the paging signal does not include information defining the allocation of the communications resource, to perform a radio channel allocation procedure with the base station for the terminal device to be allocated the communications resource; and control the transceiver to establish wireless (Continued)

communication with the base station by sending the connection request message using the allocated communications resource.

18 Claims, 9 Drawing Sheets

(51) Int. Cl.
     *H04W 68/02*      (2009.01)
     *H04W 74/00*      (2009.01)
     *H04W 68/00*      (2009.01)
     *H04W 52/02*      (2009.01)
     *H04W 76/11*      (2018.01)
     *H04W 88/02*      (2009.01)
     *H04W 88/08*      (2009.01)

(52) U.S. Cl.
     CPC ......... *H04W 68/005* (2013.01); *H04W 68/02* (2013.01); *H04W 72/042* (2013.01); *H04W 74/006* (2013.01); *H04W 76/10* (2018.02); *H04W 76/11* (2018.02); *H04W 88/02* (2013.01); *H04W 88/08* (2013.01)

(56) References Cited

U.S. PATENT DOCUMENTS

| | | |
|---|---|---|
| 2011/0317648 A1 | 12/2011 | Lee et al. |
| 2014/0177568 A1 | 6/2014 | Lee et al. |
| 2014/0177569 A1 | 6/2014 | Lee et al. |
| 2015/0281940 A1* | 10/2015 | Yu .......................... H04W 8/02 455/456.1 |
| 2017/0013391 A1* | 1/2017 | Rico Alvarino .... H04W 68/005 |
| 2017/0034853 A1 | 2/2017 | Rune et al. |
| 2017/0245241 A1* | 8/2017 | Yu ........................ H04W 16/26 |
| 2018/0063722 A1* | 3/2018 | Lee ....................... H04W 48/12 |
| 2018/0103419 A1* | 4/2018 | Lee ....................... H04W 16/26 |
| 2018/0212736 A1* | 7/2018 | Chatterjee ............. H04W 48/12 |

OTHER PUBLICATIONS

LTE Advanced, "3rd Generation Partnership Project; Technical Specification Group Radio Access Network; Study on provision of low-cost Machine-Type Communications (MTG) User Equipments (UEs) based on L TE (Release 12)", 3GPP TR 36.888 v12.0.0 (Jun. 2013), Total 55 pages.

International Search Report dated Oct. 18, 2016 in PCT/EP2016/069824 filed Aug. 22, 2016.

\* cited by examiner

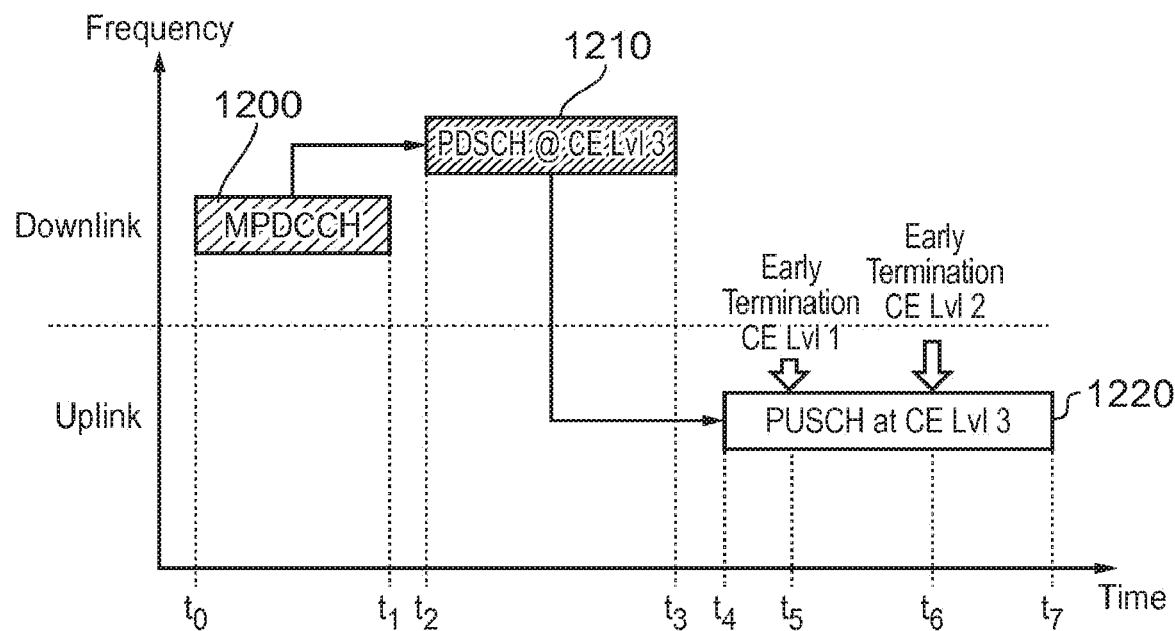
FIG. 12
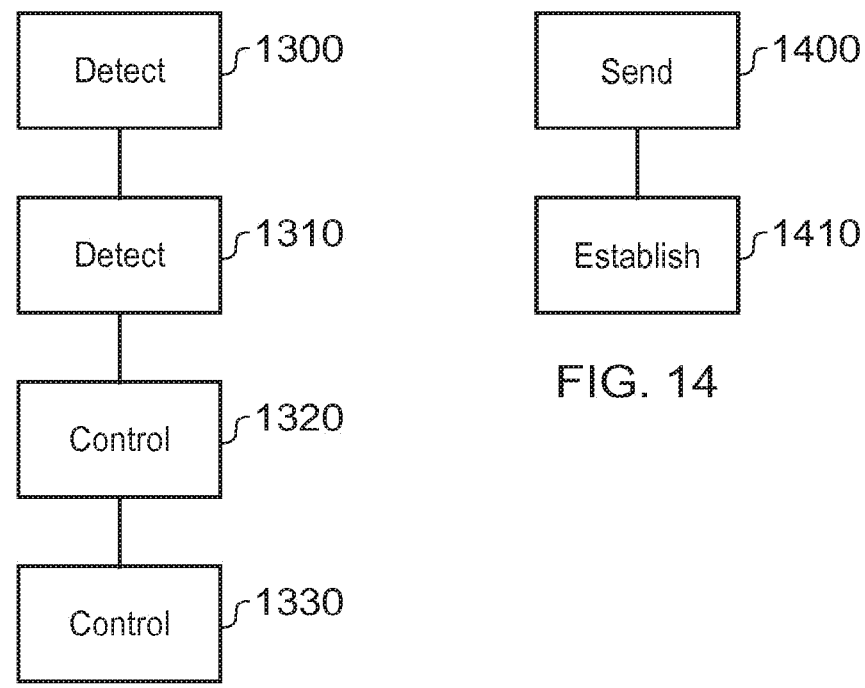
FIG. 13
FIG. 14

METHODS, APPARATUSES AND SYSTEM FOR TRANSMISSION OF A CONNECTION REQUEST MESSAGE IN A WIRELESS COMMUNICATIONS SYSTEM

CROSS-REFERENCE TO RELATED APPLICATIONS

The present application is a continuation of U.S. application Ser. No. 15/751,357, filed Feb. 8, 2018, which is based on PCT filing PCT/EP2016/069824, filed Aug. 22, 2016, which claims priority to EP 15186988.0, filed Sep. 25, 2015, the entire contents of each are incorporated herein by reference.

BACKGROUND

Field

This disclosure relates to wireless telecommunications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Low Complexity MTC (Machine Type Communication) UE (user equipment) (LC-MTC) has been proposed, for example in the 3GPP ($3^{rd}$ Generation Partnership Project). Features of LC-MTC UE include low complexity, potential for low cost, coverage enhancement and potential for reduced power consumption.

A technique to reduce complexity and cost for LC-MTC UE is to restrict the UE to operate within 6 PRBs (Physical Resource Blocks). The system bandwidth is therefore divided into multiple 6 PRB narrowbands and the LC-MTC UE is expected to be able to tune into any of these narrowbands.

In the coverage enhancement (CE) feature, the coverage for LC-MTC is extended by 15 dB (decibels) relative to that of a so-called Cat-1 UE. The main technique for CE is via numerous repetitions of the same message, with the received versions being combined in order to improve the signal to noise ratio of the combination as compared to that of any individual instance of the message. Numerous repetition of the same message would significantly decrease the spectral efficiency. Therefore, for operation in CE mode, multiple coverage enhancement levels (CE levels) or repetition levels are introduced such that the appropriate number of repetitions is used at each CE level.

In previously proposed arrangements, for a network initiated call, the network pages a UE in idle mode to initiate the UE to start a Radio Resource Control (RRC) connection. The UE would then start a RACH (Random Access Channel) process, which consists of transmitting a Physical Random Access Channel (PRACH) preamble and receiving a RAR (Random Access Response) from the eNB (e-NodeB). Since more than one UE may access the network using PRACH within the same time, the RAR would indicate which PRACH preamble the network responds to. The RAR also provides an uplink grant that schedules the subsequent Message 3 where the UE would send a RRC Connection Request message.

For operation in CE mode, the PRACH (preamble) needs to be repeated numerous times. It has been agreed in 3GPP that there will be 3 CE levels for PRACH, each CE level representing a greater number of repetitions (and so, at least in principle, the ability to cope with a greater range and thus a worse signal to noise ratio). The LC-MTC UE would perform several PRACH attempts in each CE level and if it fails after the maximum number of attempts is reached, it will move to the next CE level and start a further set of PRACH attempts. Similarly, the RAR would also be sent in a repetitive manner. A RAR time window may also be used in order to spread the load of the RAR and the LC-MTC UE would need to decode each MAC PDU within the time window.

In general, these processes could consume a lot of LC-MTC UE battery power and also use up radio resources over a potentially extended period.

It is a constant aim to improve the operation and efficiency of wireless network systems.

SUMMARY

The present disclosure can address or mitigates the problems discussed above.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 11 and 12 are schematic timing diagrams relating to a communication interaction using coverage enhancement (CE);

FIG. 13 is a schematic flowchart summarizing a method of operation of a UE; and FIG. 14 is a schematic diagram summarizing a method of operation of a base station.

DESCRIPTION OF THE EMBODIMENTS

Figure 1:
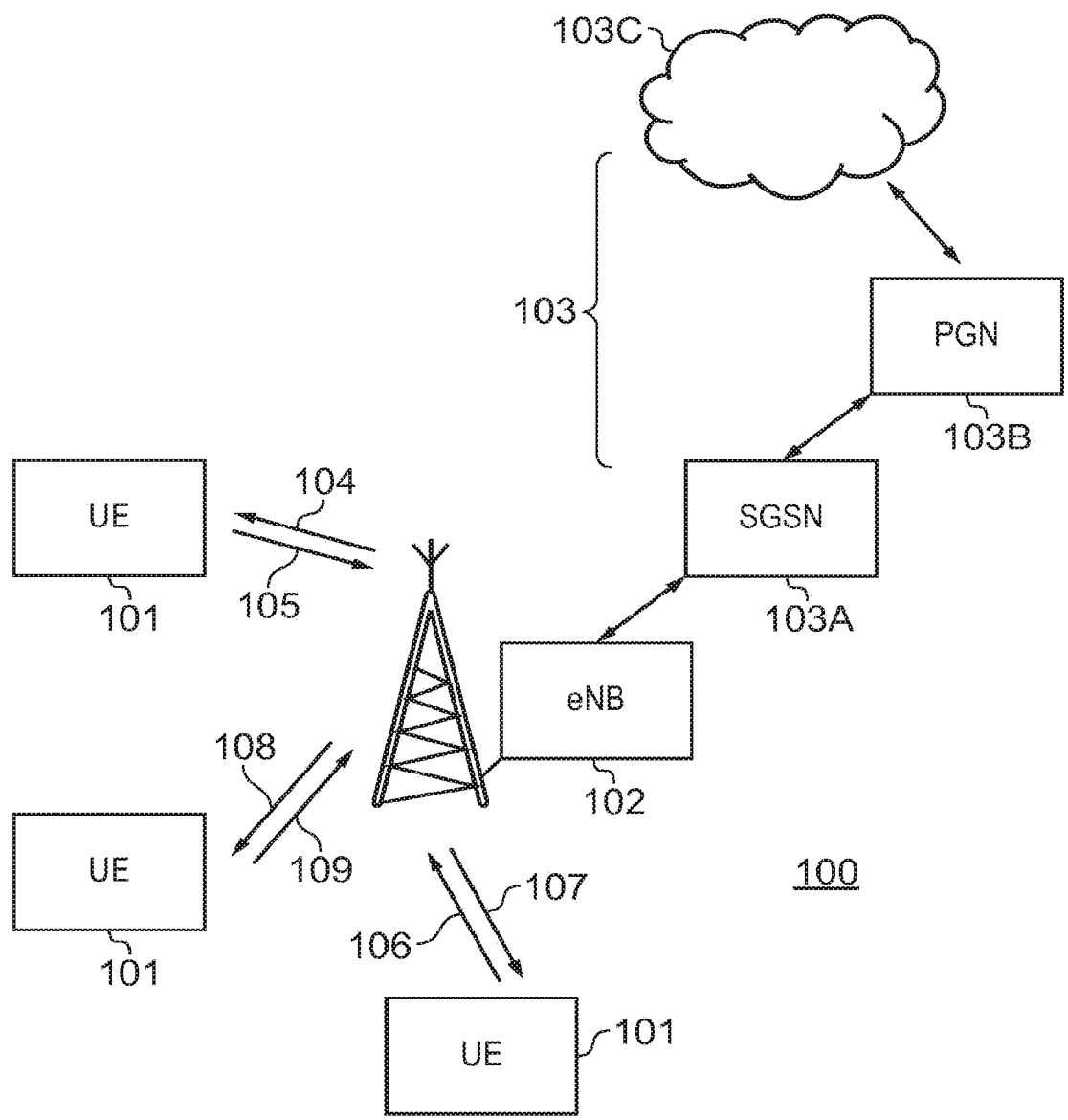
FIG. 1 schematically illustrates a mobile telecommunications system.

FIG. 1 provides a schematic diagram of a mobile telecommunications system 100, where the system includes mobile communications terminals (such as UEs) 101, infrastructure equipment 102 and a core network 103.

The infrastructure equipment may also be referred to as a base station, network element, enhanced Node B (eNodeB or eNB) or a coordinating entity for example, and provides a wireless access interface to the one or more communications terminals within a coverage area or cell. The one or more mobile communications terminals may communicate data via the transmission and reception of signals representing data using the wireless access interface. The infrastructure equipment 102 is communicatively linked to core network components such as a serving gateway support node (SGSN) 103A, a packet gateway node 103B and an external network 103C, which may be connected to one or more other communications systems or networks which have a similar structure to that formed from communications terminals 101 and infrastructure equipment 102.

The core network 103 may also provide functionality including authentication, mobility management, charging and so on for the communications terminals served by the network entity. The mobile communications terminals 101 of FIG. 1 may also be referred to as communications terminals, user equipment (UE), terminal devices and so forth, and are configured to communicate with one or more other communications terminals served by the same or a different coverage area via the infrastructure equipment. These communications may be performed by transmitting and receiving signals representing data using the wireless access interface over the two way communications links represented by lines 104 to 109, where 104, 106 and 108 represent downlink communications from the infrastructure equipment to the communications terminals and 105, 107 and 109 represent uplink communications from the communications terminals to the infrastructure equipment. The telecommunications system 100 may operate in accordance with a telecommunications protocol. For instance in some examples the system 100 may generally operate in accordance with a 3GPP Long Term Evolution (LTE) standard where the network entity and communications terminals are commonly referred to as eNodeB and UEs, respectively.

A brief description of the LTE wireless access interface is explained in the following paragraphs with reference to FIGS. 2 and 3 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
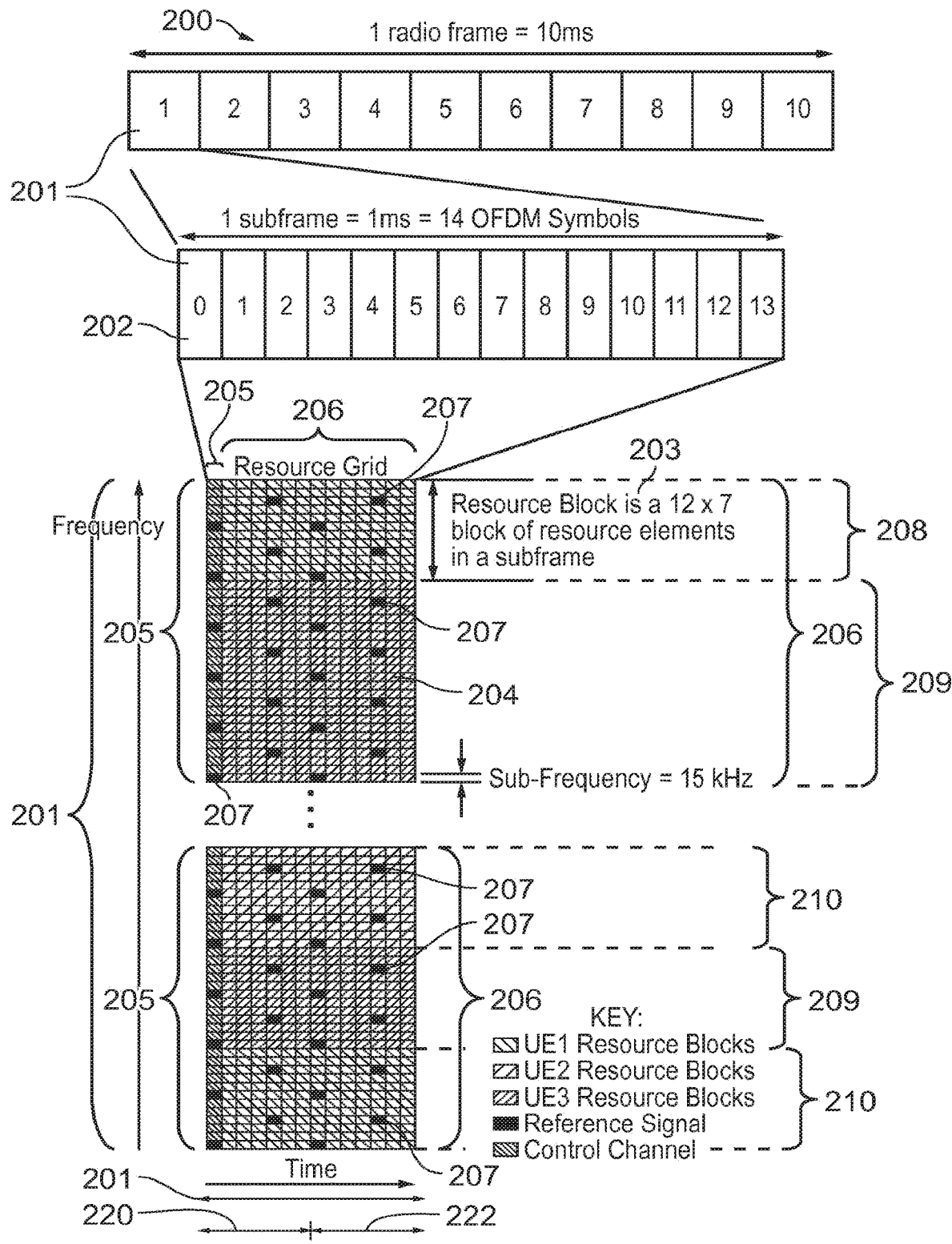
FIG. 2 provides a simplified schematic diagram of the structure of a downlink of a wireless access interface.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3:
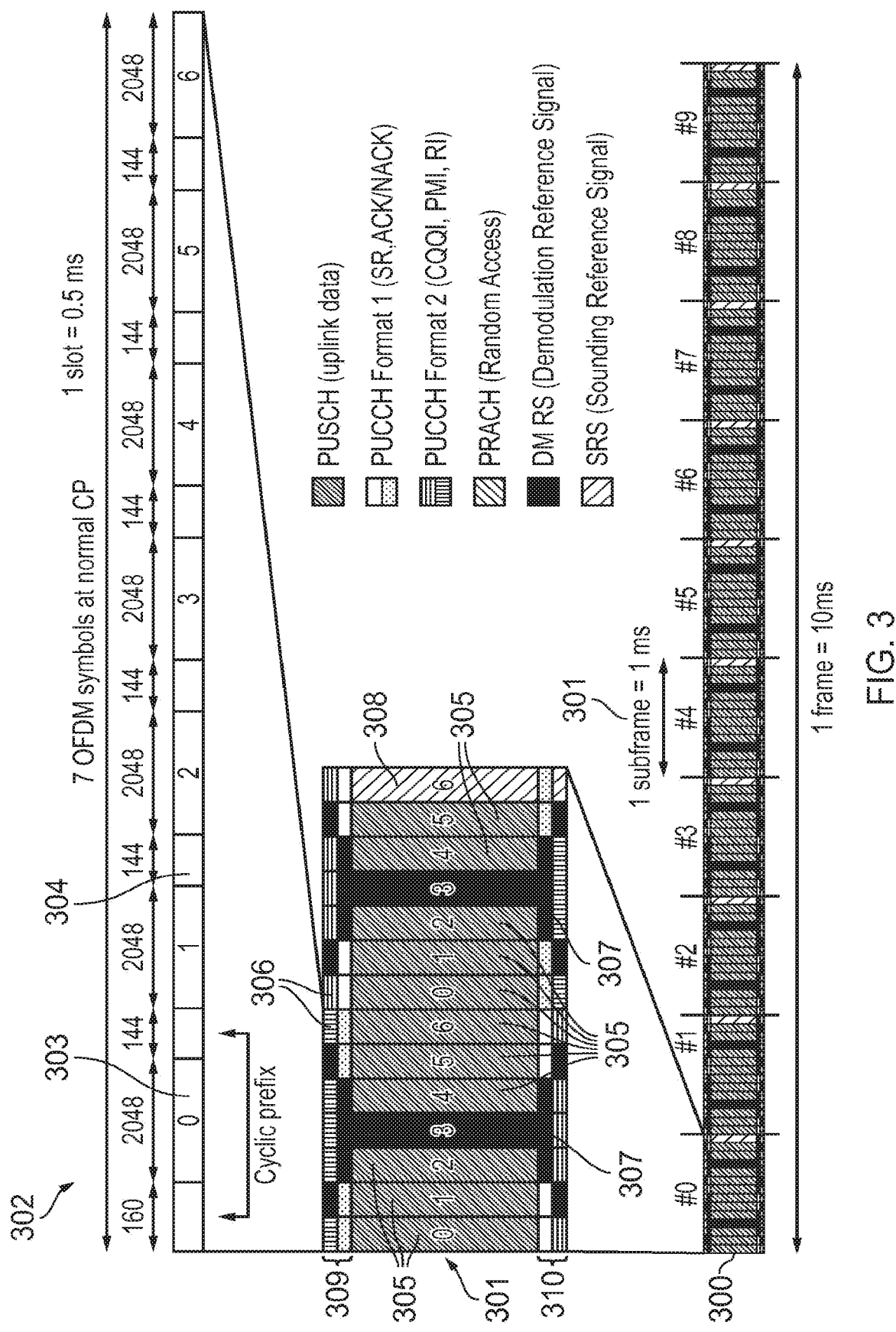
FIG. 3 provides a simplified schematic diagram of the structure of an uplink of a wireless access interface.

FIG. 3 provides a simplified schematic diagram of the structure of an uplink of an LTE wireless access interface that may be provided by or in association with the base station of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes.

The LTE data or datagram is transmitted on the PDSCH on the downlink and on the PUSCH in the uplink. The resources on the PDSCH and the PUSCH are allocated to the terminal device by the base station.

Figure 4:
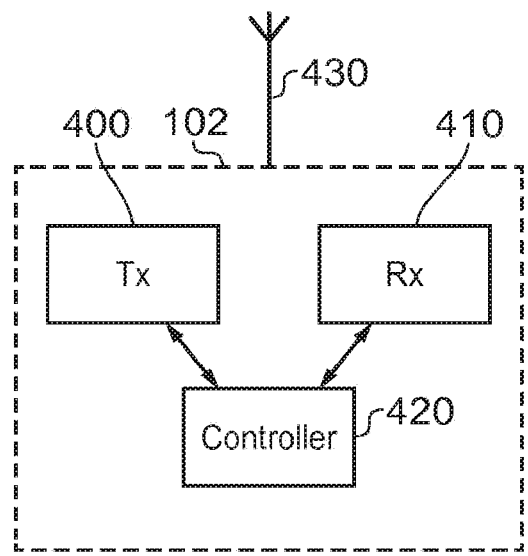
FIG. 4 schematically illustrates a base station.

FIG. 4 schematically illustrates a base station 102 in more detail. The base station 102 includes a transmitter (Tx) 400 for transmitting signals via a wireless access interface (and via an antenna 430) to the one or more communications devices or UEs, and a receiver (Rx) 410 to receive signals from the one or more UEs within the coverage area of the base station. A controller 420 controls the transmitter 400 and the receiver 410 to transmit and receive the signals via the wireless access interface. The transmitter 400 and receiver 410 together form a transceiver. The controller 420 may perform a function of controlling the allocation of communications resource elements of the wireless access interface and may in some examples include a scheduler for scheduling transmissions via the wireless access interface for both an uplink and the downlink. Operations of a base station discussed in connection with the description below may be undertaken or overseen, at least in part, by the controller 420. FIG. 4 therefore provides an example of a base station for use in a wireless telecommunications system, the base station comprising a transceiver 400, 410 configured to perform wireless communication with a terminal device; and a controller 420 configured to control the transceiver to send a wireless paging signal to the terminal device.

Figure 5:
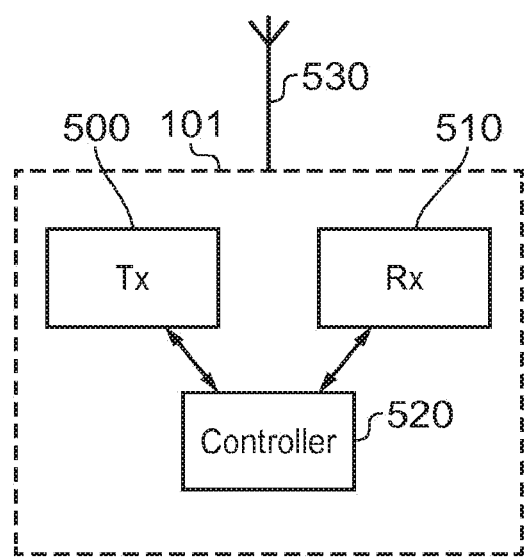
FIG. 5 schematically illustrates a user equipment (UE)

FIG. 5 schematically illustrates a UE 101 in more detail. The UE 101 includes a transmitter 500 associated with an antenna 530 for transmitting signals on the uplink of the wireless access interface to the base station 102 and a receiver 510 for receiving signals transmitted by the base station 102 on the downlink via the wireless access interface. The transmitter 500 and the receiver 510 are controlled by a controller 520. The transmitter 500 and receiver 510 together form a transceiver. Operations of a UE discussed in connection with the description below may be undertaken or overseen, at least in part, by the controller 520. In example embodiments of the present disclosure, the UE 101 is a so-called Low Complexity Machine Type Communication (LC-MTC) terminal device. FIG. 5 therefore provides an example of a terminal device for use in a wireless telecommunications system, the terminal device comprising: a transceiver 500, 510 configured to perform wireless communication with a base station; and a controller 520 configured to control the transceiver to detect a wireless paging signal from the base station.

Figure 6:
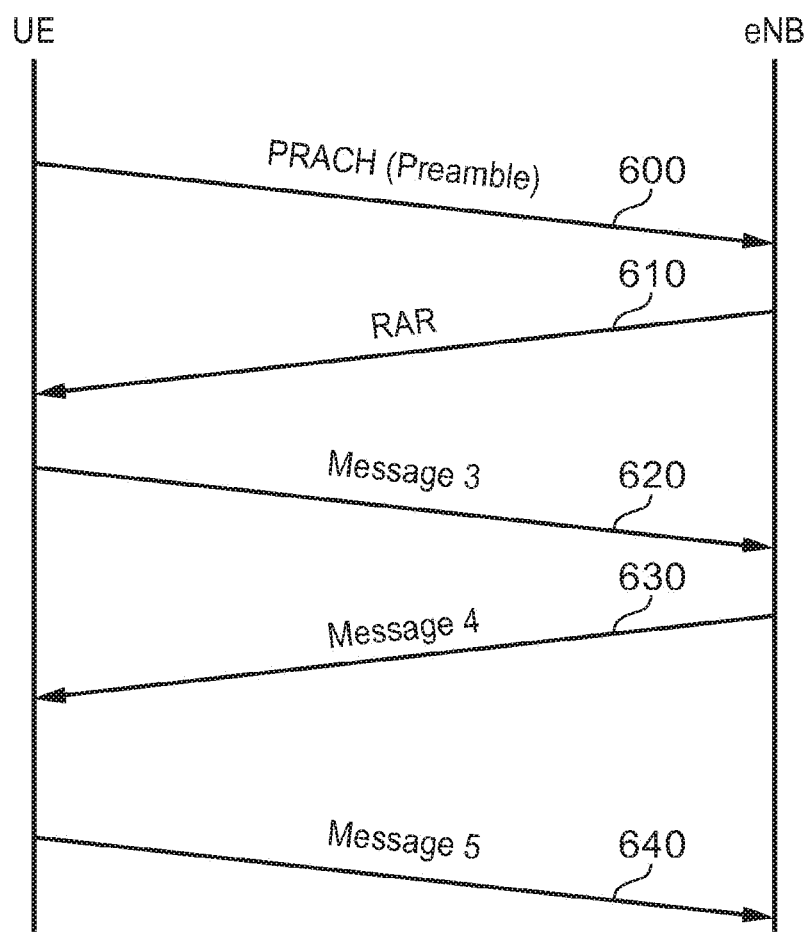
FIG. 6 schematically illustrates an RACH (random access channel) process.

FIG. 6 schematically illustrates a previously proposed RACH (random access channel) process.

For a network initiated call, the network pages a terminal device in idle mode to initiate the terminal device to start a Radio Resource Control (RRC) connection. The terminal device starts a RACH (Random Access Channel) process, which consists of transmitting a Physical Random Access Channel (PRACH) preamble 600 and receiving a RAR (Random Access Response) 610 from the base station. Since more than one terminal device may access the network using PRACH within the same time, the RAR can indicate which PRACH preamble the network responds to. The RAR also provides an uplink grant that schedules the subsequent Message 3 (620) by which the terminal device sends a RRC Connection Request message.

Multiple RARs can be multiplexed into a MAC PDU (Medium Access Control Protocol Data Unit) and this MAC PDU is transmitted within a RAR time window, 3 subframes after the transmission of the PRACH preamble. The RAR time window size can be 2 to 10 subframes, which is to say that up to 10 MAC PDUs (containing RARs) can be sent within the RAR time window.

The terminal device decodes each MAC PDU within the RAR time window until it finds its RAR. This is followed by the base station transmitting a Message 4 (RRC Connection Setup) 630 and the terminal device transmitting a Message 5 (RRC Connection Setup Complete) 640 to complete the RRC connection.

The information which the base station provides to the terminal device in the RAR (Random Access Response) message 610 may include one or more of the following:
(a) allocation of a temporary identifier or RNTI (Radio Network Temporary Identifier). An initially temporary identifier is allocated to the base station which is made permanent after a successful RACH procedure. The permanent identifier is referred to as the cell RNTI or C-RNTI.
(b) timing advance information. This takes into account a transmission delay between the base station and the terminal device so as to be used to adjust the expected timings of communications to take into account the transmission delay.
(c) allocation of uplink resources. The base station provides sufficient resource and/or scheduling information in the RAR response for the terminal device to be able to send message 3.

In other words, a communications resource provided by the base station comprises one or more of: one or more radio frequency band; a temporary radio network identifier, a timing advance parameter and one or more transmission time slots. Note that more than one radio frequency band can be defined as the communications resource if a frequency hopping or similar arrangement is in use. Note that plural time slots can be defined as the communications resource if repetition is used (which is to say, the plural time slots relating the repeated transmissions can be defined by a single allocation of uplink resources.

The present disclosure recognizes that for operation in coverage enhanced (CE) mode, which makes use of message repetition to provide more robust communications in poor signal strength or noisy environments, the PRACH (preamble) needs to be repeated numerous times. The number of repetitions depends upon the so-called CE level or mode. A terminal device according to LC-MTC potentially performs several PRACH attempts in each CE level and if it fails after the maximum number of attempts is reached, it will move to the next higher CE level (representing a next higher number of repetitions) and restart a further set of PRACH attempts. Similarly, the RAR response is also sent in a repetitive manner. The present disclosure notes that both of these factors could lead to the consumption of significant amounts of battery power in an example LC-MTC terminal device, and could also tie up radio resources over an extended period.

Embodiments of the present disclosure relate to techniques to alleviate these problems, based around providing additional information as part of a paging operation.

Figure 7:
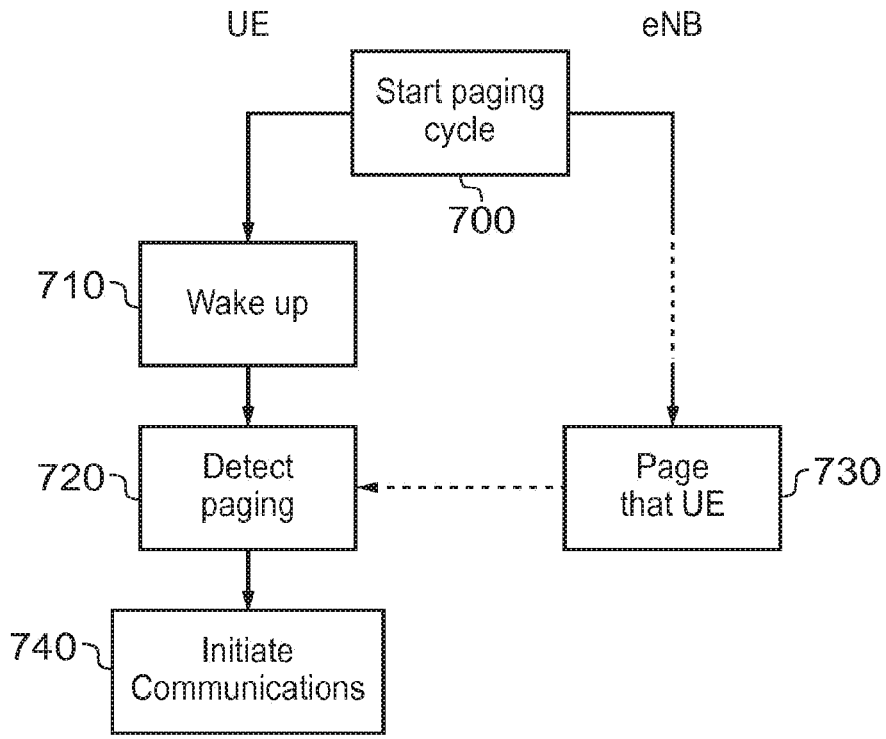
FIG. 7 is a schematic flowchart of a paging operation.

FIG. 7 is a schematic flow chart of a paging operation, which includes the start of a paging cycle at a step 700.

Paging is used for network-initiated communication with a terminal device and involves, at the start of a paging cycle, the terminal device waking up in order to detect paging information being transmitted. The paging cycles occur from time to time (for example, periodically) so a terminal device can remain in a quiescent or idle state except when the paging cycle is taking place.

At a step 720, the terminal device detects whether any paging messages are directed to that terminal device. It may well be that in any particular paging cycle, there might be no messages directed to that terminal device. However, in the schematic example of FIG. 7, the base station is in fact paging that particular terminal device at a step 730.

In response to detection of a paging message directed to that terminal device, the terminal device initiates wireless communication with the base station at a step 740, as an example of the controller of the terminal device controlling the transceiver to establish wireless communication with the base station by sending the connection request message using the allocated communications resource.

In contrast to previous proposed RRC processes, however, in the present embodiments some information is provided as part of or in association with the paging transmission to allow message 3 (FIG. 6) to be sent directly at the step 740, or in other words avoiding the need for the PRACH (preamble) and the RAR response.

Therefore, instead of requiring the terminal device to transmit a PRACH and to wait for an RAR (each of which may occur at multiple repetitions as discussed above) the paging process itself can provide the necessary information for the terminal device to send the RRC connection request at message 3. This can therefore reduce the need for, or remove, the first two steps of the RACH process shown in FIG. 6. In turn, this provides potential improvements in power consumption and/or network usage.

In particular, as noted above, the two steps removed or reduced with respect to the RACH process of FIG. 6 require multiple PRACH repetitions, ramping up to higher numbers of repetitions if successful transmission is not achieved, blind decoding for MPDCCH messages that schedule the RAR and also a blind decoding for an RAR within an RAR window. These can consume significant amounts of battery power compared to the remaining steps (message 3 onwards) where RRC connection messages are exchanged. Furthermore, the present technique can also reduce or eliminate contention at the preamble stage since the LC-MTC terminal device is provided with an uplink grant and therefore information such as the so-called Backoff Indicator that is in the MAC PDU (carrying the RAR) are not required. Since the base station knows specifically which LC-MTC terminal device it is providing the uplink grant for, information such as that indicating which preamble the base station is responding to is also not required.

At a general level, the information required for the LC-MTC terminal device to transmit message 3 (RRC connection request) contains at least the uplink grant and temporary RNTI.

Figure 8:
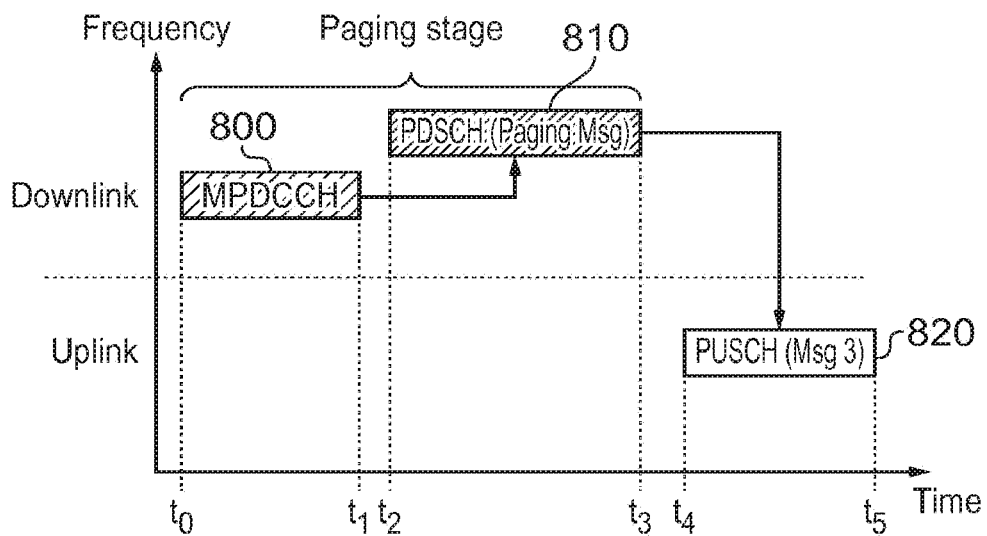
FIG. 8 is a schematic timing diagram illustrating a part of a paging operation.

FIG. 8 is a schematic timing diagram illustrating a part of a paging operation in which message 3 grant information (the information defined above, or in other words, a communications resource provided by the base station comprising one or more of: a radio frequency band, a temporary radio network identifier and a transmission time slot) which is required for the terminal device to go straight to issuing message 3 without the need for the PRACH (preamble) and RAR response is contained in the DCI (MPDCCH) 800 which schedules the paging message 810, and/or in the paging message 810 itself (carried by the PDSCH). This is an example of the paging signal comprising a data field defining the communications resource. Where the message 3 grant information is in the paging message 810, this is an example of the paging signal comprising a first portion 800 and a second portion 810, the first portion comprising scheduling data scheduling the transmission of the second portion, the second portion comprising a data field defining the communications resource. Where the message 3 grant information is in the DCI 800, this is an example of the paging signal comprising a first portion 800 and a second portion 810, the first portion comprising scheduling data scheduling the transmission of the second portion, the first portion comprising a data field defining the communications resource.

A so-called paging occasion is defined, for example, on a periodic basis, as a time to where the terminal device wakes up from a quiescent "DRX" (discontinuous reception) mode and monitors the MPDCCH search space for a possible DCI (downlink control information) which schedules the paging message. At the end of the MPDCCH search space (taking repetition into account) the terminal device detects an MPDCCH 800 and decodes it. The decoded MPDCCH 800 provides scheduling information to allow the terminal device to detect and decode the PDSCH containing the paging message at time $t_2$.

In some examples, the paging messaging 810 contains not only the identifier for the particular terminal device such as an IMSI (international mobile subscriber identity) but also the message 3 grant information (an uplink grant and a temporary RNTI) to allow message 3 to be sent without the need for the PRACH (preamble) and RAR response. Using this information, the terminal device sends message 3 820 using the PUSCH resource provided in the message 3 grant.

In another example, instead of including the message 3 grant information in the paging message 810, it is instead (or even, in some examples, as well) included in the DCI 800 that schedules the paging message. This arrangement can be useful when the number of terminal devices to be paged at a current paging cycle is small or even one.

In other examples, the DCI 800 can contain part of the message 3 grant information that is common to all currently paged terminal devices, and the paging message 810 contains the remaining (terminal device-specific) information. For example, the DCI 800 may contain a reference (base) narrowband where the PUSCH for message 3 is to be transmitted, and the paging message 810 contains an offset to this reference narrowband to pinpoint an exact narrowband PRB (physical resource block) for transmission of the PUSCH message 3. These embodiments can provide a slight reduction in the quantity of data needed to transmit the message 3 grant information.

Features relating to timing advance will now be discussed.

Figure 9:
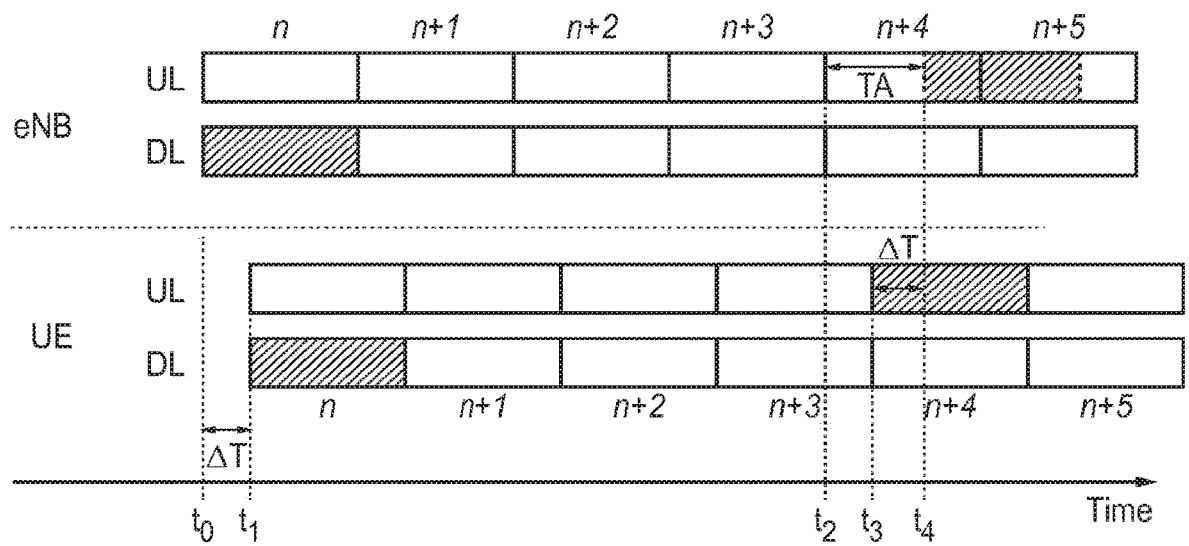
FIG. 9 is a schematic timing diagram of a communication interaction.

First, comparison will be made with timing issues relating to the previously proposed RACH process described with reference to FIG. 6. In the previously proposed process, the first uplink transmission such as the PRACH preamble would typically arrive later within the designated uplink subframe at the base station because of a propagation delay. FIG. 9 is a schematic timing diagram to illustrate this point. Here, the base station transmits a paging message at a time $t_0$ in a subframe n to the terminal device. Because of propagation delays the terminal device receives the paging message a short time ($\Delta T$ ms) later at a time $t_1$. Assuming the terminal device transmits the uplink transmission, PRACH, at subframe n+4 at $t_3$, the same propagation delay $\Delta T$ means that it would arrive at the base station at a time $t_4$. However, the corresponding subframe n+4 at the base station started at a time $t_2$. This would mean that the PRACH arrives late, by a total delay TA. In the previously proposed arrangement of FIG. 6 this is corrected by the timing advance response, that is to say that the base station requests the terminal device to advance its transmissions (send them earlier) by TA ms.

In the present examples, message 3 is the first uplink transmission by the terminal device, instead of the PRACH preamble. Message 3 is therefore not timing advanced to arrive at the subframe boundary, because timing advance information has not yet been provided by the base station (in turn, because the RAR response has been omitted).

Figure 10:
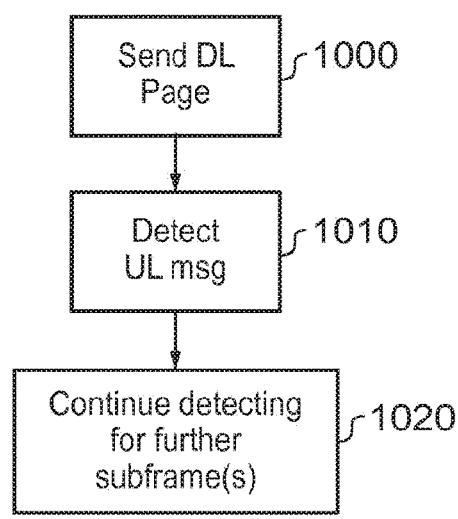
FIG. 10 is a schematic flowchart illustrating a part of a communication interaction.

Example embodiments allow the base station to cope with this delay, and FIG. 10 is a schematic flowchart relating to such a process.

A step 1000 of FIG. 10 relates to the sending of the downlink paging information, as an example of a base station controller being configured to control the transceiver to send a wireless paging signal to the terminal device, the paging signal comprising information defining an allocation of a communications resource for use by the terminal device to send a connection request message to the base station; and to control the transceiver to establish wireless communication with the terminal device by receiving the connection request message using the allocated communications resource. At a step 1010, an uplink message (message 3) is detected during the sub frame n+4 (relative to the subframe n at which the paging message was sent). A step 1020 relates to the base station continuing to detect the uplink message during one or more further subframes following the subframe n+4.

In the example of FIG. 9, this would mean that the base station reserves not only the subframe n+4 but also the subframe n+5 to receive the message 3, in order to account for potentially delayed propagation from the terminal device.

More generally, the number of subframes to be reserved in this way can depend upon the repetition level. If the number of repetitions for message 3 (according to the CE mode in use) is R, then the base station would reserve the subframe n+4 and R additional uplink subframes for the message 3 transmission. This provides an example of the base station being configured to selectively operate at multiple coverage enhancement (CE) modes for communication with the terminal device, each CE mode corresponding to a different respective number of repetitions of wireless data signals to or from the terminal device; and the controller of the base station being configured to control the transceiver to receive the connection request message in the defined subframe and a number of temporally following subframes dependent upon the number of repetitions used in the CE mode applicable to communications from the terminal device. In examples, the number of temporally following subframes is equal to the number of repetitions.

In the arrangement of FIG. 6, the timing advance information to align uplink messages with subframe boundaries was sent in the MAC PDU containing the RAR response and also transmitted during connection from the MAC layer. For operation under the present examples, the timing advance information can instead be transmitted to the terminal device by one or more of the following:
(a) In the HARQ (Hybrid automatic repeat request) acknowledgment/negative acknowledgement DCI during a retransmission of message 3:
(b) In message 4: and/or
(c) By transmission of a timing advance control MAC message to the terminal device after message 5. This would require the base station to reserve an additional subframe to absorb the last PUSCH repetition carrying message 5.

In terms of detection of the required timing advance, in the previously proposed examples the base station could use the PRACH preamble to detect the delay timing due to the propagation delay, by using a correlator function on the preamble. In the present examples, the PRACH preamble is not sent, but in example embodiments a preamble can be transmitted by the terminal device, for example prior to transmission of message 3. That preamble, and/or the requirement for that preamble, and/or the RACH resource to be used for that preamble, can be indicated by the base station in the DCI which schedules the paging message or the paging message itself. This preamble can be different from those used for PRACH preamble.

Features concerning potential changes in CE level will now be discussed. As discussed, CE levels relate to the terminal device being configured to selectively operate at multiple coverage enhancement (CE) modes, each CE mode corresponding to a different respective number of repetitions of wireless data signals to or from the terminal device.

In example embodiments, an LC-MTC terminal device in idle or quiescent mode does not inform the network if there is a change in CE level. Therefore, a base station is not necessarily aware of the terminal device's current CE level. In examples, a consequence of this is that message 3 is transmitted at the highest CE level (that is to say, the CE level or mode corresponding to a highest number of repetitions).

It has been proposed that the paging message be targeted at a different CE level or mode, where an arrangement is used in which the DCI which schedules the paging message (that is to say, the MPDCCH search space) and the paging message itself can occupy different communication resources (for example, a different narrowband and/or a different time period). Therefore, in example embodiments, where a paging message occupies a different CE level (different to the maximum CE level or different to the CE level currently in use by the terminal device), the paging message will provide message 3 grant using resources that correspond to that CE level.

Figure 11:
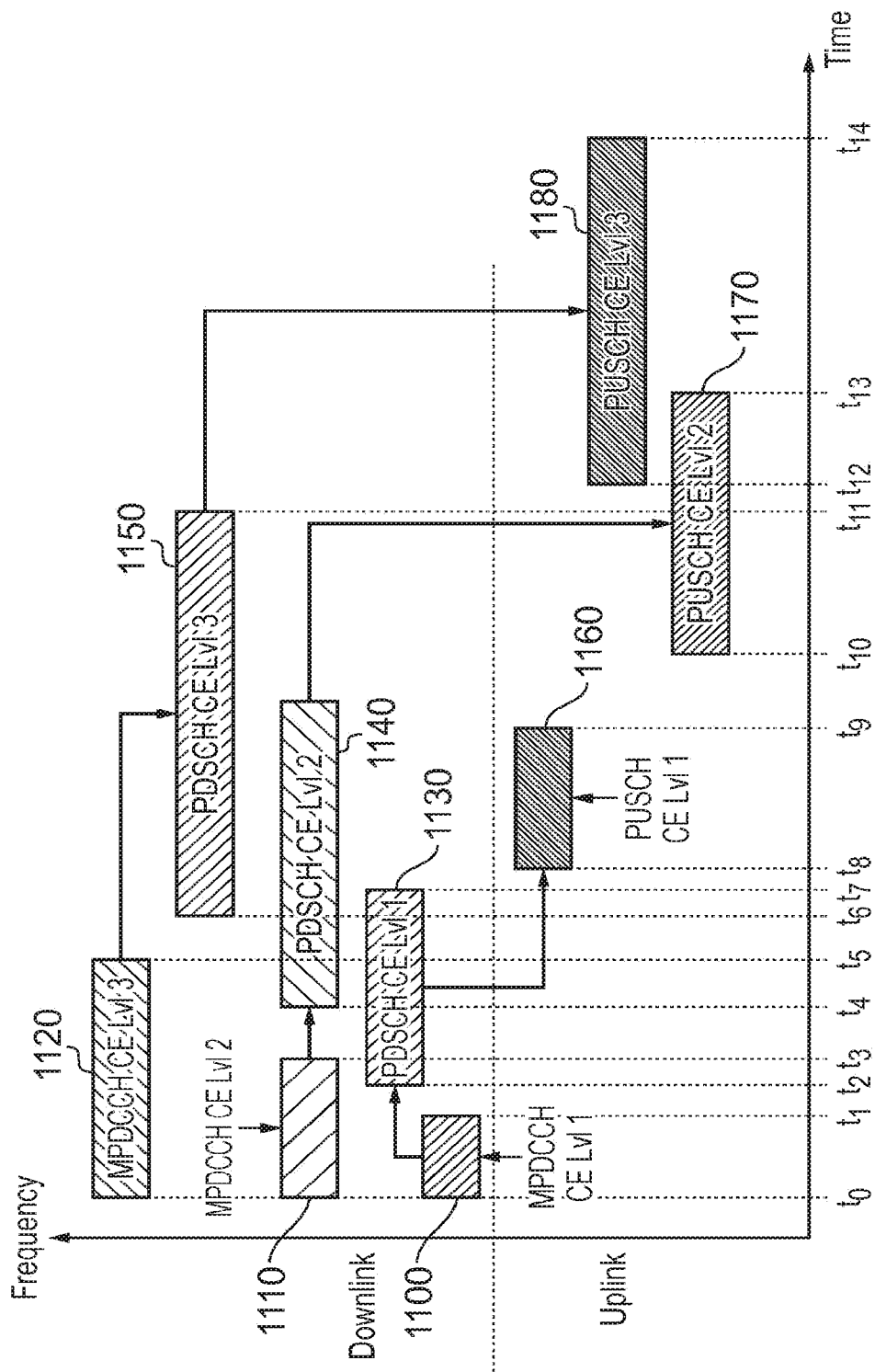

In FIG. 11, a paging cycle starts at a time to, and three different DCIs, corresponding to three different MPDCCH search spaces, are provided to schedule three respective paging messages. In particular, the three different DCIs 1100, 1110, 1120 relate to respective CE levels 1, 2, 3, where CE level 3 represents a higher number of repetitions than CE level 2, which in turn represents a higher number of repetitions than CE level 1. Each of these DCIs schedules a respective paging message 1130, 1140, 1150, again at CE levels 1, 2 and 3 respectively. This provides an example of the base station controller being configured to control the transceiver to send multiple paging signals at different respective CE modes, each paging signal defining a respective communications resource for use by the terminal device.

Depending on current propagation conditions, signal strength, noise conditions and so on, the terminal device may be able to detect the paging message at CE level 1, in which case the terminal device uses CE level 1 and the resources defined by the paging message 1130 for its uplink transmission of message 3 (a transmission 1160). If not, then if the terminal device can detect the paging message 1140 at CE level 2, it uses the resources defined by that paging message for its uplink message 3 1170 at CE level 2. If not, then assuming the terminal device can detect the paging message 1150 at CE level 3, it uses the resources defined by that paging message 1150 to send its uplink message 3 1180 at CE level 3.

Therefore, in FIG. 11, different system resources are used to transmit respective pairs of DCIs which schedule paging messages (DCIs 1100, 1110, 1120) and different resources are used to provide the respective paging messages at the different respective CE levels (1130, 1140, 1150). The terminal device responds to the lowest one of these CE level paging messages which it can successfully detect, and transmits an uplink message 1160, 1170 or 1180 using the resources defined by the respective paging message. Note that in embodiments, the terminal device sends only one of the uplink message 3s (1160, 1170, 1180), being the one instance of message 3 at the CE level defined by the lowest CE level paging message successfully decoded by the terminal device. This provides an example of the controller of the terminal device being configured to set a CE mode according to the CE mode of a detected paging signal.

In further examples, the paging message and/or the DCI which schedules the paging message are not in fact differentiated by CE level. That is to say, in these further examples, a single paging message and/or a single DCI which schedules the paging message is used. In such examples, the LC-MTC terminal device can transmit the first message 3 transmission at the highest CE level (corresponding to the greatest number of repetitions) the base station can then adjust the CE level (if appropriate) using information provided with the HARQ DCI. In this way, a second HARQ re-transmission can be transmitted at a different (lower) repetition level corresponding to a different (lower) CE level specified as part of the HARQ response. This provides an example of a terminal device configured to perform wireless communication with the base station using the allocated communications resource by sending the connection request message using a predetermined CE mode, and to receive information from the base station, in response to that connection request message, indicating a required CE mode.

In further examples, the paging message and/or the DCI which schedules the paging message are not differentiated by CE level. However, the terminal device can perform early termination of its message 3 repetition based on its own CE level. So, for example, the arrangement shown schematically in FIG. 12 may be used, in which a single DCI 1200 schedules a single paging message 1210 at CE level 3. The paging message defines resources for use by the terminal device in transmitting its message 3 1220. The resources define sufficient time (from $t_4$ through to $t_7$) to allow the terminal device to transmit the message 3 1220 at CE level 3, the highest level of repetition in this example. However, the terminal device is aware of its own CE level and is therefore aware that there is no need to transmit message 3 at a higher repetition level than the repetition level defined by the terminal device's own CE level. Therefore, if the CE level of the terminal device lower than level 3, the terminal device can terminate transmission of message 3 early, which is to say, at a lower number of repetitions than those available using the scheduled resources provided by the paging message 1210. This provides an example of a terminal device configured to receive the paging signal using a predetermined CE mode and to perform wireless communication using a CE mode associated with the terminal device.

In the specific example of FIG. 12, if the terminal device has a CE level of 1, the message 3 transmission can be terminated after a number of repetitions corresponding to CE level 1, at a time $t_5$. If the terminal device has a CE level of 2, the transmission of the message 3 can be terminated by the terminal device at a time $t_6$ corresponding to a number of repetitions at least equal to those applicable to CE level 2. The time points at which termination takes place ($t_5$ and $t_6$) can be predefined by the network or by specification known to both the base station and the terminal device. Assuming that the early termination points $t_5$ and $t_6$ are defined, the base station is aware of the termination points and is able to send its HARQ response at the appropriate time conforming to the normal HARQ timing constraints. As discussed above, the DCI of the HARQ can provide information to the terminal device amending the CE level to be used by the base station, potentially to match that of the terminal device.

In example embodiments, the DCI which schedules the paging message, and/or the paging message itself, can indicate whether or not a reduced RACH process (where the PRACH and/or the RAR are omitted) is to be used. This information can be provided explicitly as a flag or data field, or can be provided implicitly, in that the absence of message 3 grant information in the paging message can indicate that a full RACH process should be used. This arrangement can provide improved flexibility for the scheduling algorithms used at the base station. The detection of a presence or absence of the grant information in the paging message provides an example of detecting whether the paging signal comprises information defining an allocation of a communications resource for use by the terminal device to send a connection request message to the base station. In response to a detection that the paging signal does not comprise information defining the allocation of the communications resource, the controller of the terminal device can control the transceiver to perform a radio channel allocation (RACH) procedure with the base station in order for the terminal device to be allocated the communications resource.

In other example embodiments, if the base station indicates that the full RACH process (including PRACH and RAR) should be used, the base station can additionally indicate in the paging message and/or in the DCI scheduling the paging message, the RACH resource to be used for the PRACH preamble. That is to say, the base station can reserve an RACH resource for that particular terminal device to use for its PRACH preamble, which can reduce its use of collision.

In example embodiments, if the reduced RACH process were to fail, that is to say, the message 3 (as the first uplink transmission) were to fail to reach the base station or to be successfully detected and decoded by the base station, the terminal device could re-try by performing the full RACH process, for example at the same CE level as that used for the failed message 3. As before, if the RACH process were not successful at that CE level, the CE level could be ramped up. This provides an example of a terminal device in which, when the controller detects that the base station has not acknowledged a connection request message sent in response to a paging signal directed to that terminal device, the controller is configured to follow a radio channel allocation procedure with the base station. For example, the controller may be configured to follow a radio channel allocation procedure using the CE mode at which the connection message was sent.

Similarly, if the terminal device fails even to detect the presence of the uplink allocation in the paging message, it will revert to the full RACH procedure. This is an example of a base station in which, for a terminal device from which the base station does not receive a connection request message in response to a paging signal directed to that terminal device, the controller (of the base station) is configured to follow a radio channel allocation procedure with that terminal device.

The operations of the terminal device and the base station as described may be carried out by the respective controller interacting with the transmitter and receiver (which collectively provide a respective transceiver). The functions may be performed (in examples) at least in part by computer software, such as computer software stored on a non-transitory machine-readable storage medium (such as a magnetic or optical disk) being run by (or used to control operations of) a computer.

FIG. 13 is a schematic flowchart summarizing a method of operation of terminal device for use in a wireless telecommunications system and configured to perform wireless communication with a base station; the method comprising:

detecting (at a step 1300) a wireless paging signal from the base station;

detecting (at a step 1310) whether the paging signal comprises information defining an allocation of a communications resource for use by the terminal device to send a connection request message to the base station;

controlling (at a step 1320) the transceiver, in response to a detection that the paging signal does not comprise information defining the allocation of the communications resource, to perform a radio channel allocation procedure with the base station in order for the terminal device to be allocated the communications resource; and controlling (at a step 1330) the transceiver to establish wireless communication with the base station by sending the connection request message using the allocated communications resource.

FIG. 14 is a schematic diagram summarizing a method of operation of a base station for use in a wireless telecommunications system and configured to perform wireless communication with a terminal device; the method comprising:

sending (at a step 1400) a wireless paging signal to the terminal device, the paging signal comprising information defining an allocation of a communications resource for use by the terminal device to send a connection request message to the base station; and establishing (at a step 1410) wireless communication with the terminal device by receiving the connection request message using the allocated communications resource.

Where methods of processing, coding or decoding are discussed above, it will be appreciated that apparatus configured to perform such methods are also considered to represent embodiments of the disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

Respective aspects and features of embodiments of the disclosure are defined by the following numbered clauses:

1. A terminal device for use in a wireless telecommunications system, the terminal device comprising:

a transceiver configured to perform wireless communication with a base station; and a controller configured to:

control the transceiver to detect a wireless paging signal from the base station;

detect whether the paging signal comprises information defining an allocation of a communications resource for use by the terminal device to send a connection request message to the base station;

control the transceiver, in response to a detection that the paging signal does not comprise information defining the allocation of the communications resource, to perform a radio channel allocation procedure with the base station in order for the terminal device to be allocated the communications resource; and control the transceiver to establish wireless communication with the base station by sending the connection request message using the allocated communications resource.

2. A terminal device according to clause 1, in which the communications resource comprises one or more of: one or more radio frequency bands; a temporary radio network identifier and one or more transmission time slots.

3. A terminal device according to clause 1 or clause 2, in which the paging signal comprises a data field defining the communications resource.

4. A terminal device according to any one of clauses 1 to 3, in which the paging signal comprises a first portion and a second portion, the first portion comprising scheduling data scheduling the transmission of the second portion, the first portion comprising a data field defining the communications resource.

5. A terminal device according to any one of clauses 1 to 3, in which the paging signal comprises a first portion and a second portion, the first portion comprising scheduling data scheduling the transmission of the second portion, the second portion comprising a data field defining the communications resource.

6. A terminal device according to any one of the preceding clauses, the terminal device being configured to selectively operate at multiple coverage enhancement (CE) modes, each CE mode corresponding to a different respective number of repetitions of wireless data signals to or from the terminal device.

7. A terminal device according to clause 6, in which the controller is configured to set a CE mode according to the CE mode of a detected paging signal.

8. A terminal device according to clause 6, configured to perform wireless communication with the base station using the allocated communications resource by sending the connection request message using a predetermined CE mode, and to receive information from the base station, in response to that connection request message, indicating a required CE mode.

9. A terminal device according to clause 6, configured to receive the paging signal using a predetermined CE mode and to perform wireless communication using a CE mode associated with the terminal device.

10. A terminal device according to clause 9, in which, when the controller detects that the base station has not acknowledged a connection request message sent in response to a paging signal directed to that terminal device, the controller is configured to follow a radio channel allocation procedure with the base station.

11. A terminal device according to clause 10, in which the controller is configured to follow a radio channel allocation procedure using the CE mode at which the connection message was sent.

12. A base station for use in a wireless telecommunications system, the base station comprising:

a transceiver configured to perform wireless communication with a terminal device; and a controller configured to:

control the transceiver to send a wireless paging signal to the terminal device, the paging signal comprising information defining an allocation of a communications resource for use by the terminal device to send a connection request message to the base station; and control the transceiver to establish wireless communication with the terminal device by receiving the connection request message using the allocated communications resource.

13. A base station according to clause 12, in which the communications resource comprises one or more of: one or more radio frequency bands; a temporary radio network identifier and one or more transmission time slots.

14. A base station according to clause 12 or clause 13, in which the paging signal comprises a data field defining the communications resource.

15. A base station according to any one of clauses 12 to 14, in which the paging signal comprises a first portion and a second portion, the first portion comprising scheduling data scheduling the transmission of the second portion, the first portion comprising a data field defining the communications resource.

16. A base station according to any one of clauses 12 to 14, in which the paging signal comprises a first portion and a second portion, the first portion comprising scheduling data scheduling the transmission of the second portion, the second portion comprising a data field defining the communications resource.

17. A base station according to any one of clauses 12 to 15, the base station being configured to selectively operate at multiple coverage enhancement (CE) modes for communication with the terminal device, each CE mode corresponding to a different respective number of repetitions of wireless data signals to or from the terminal device.

18. A base station according to clause 17, configured to receive the connection request message using a predetermined CE mode, and to send information to the terminal device which sent that connection request message, indicating a required CE mode.

19. A base station according to clause 17, in which the controller is configured to control the transceiver to send multiple paging signals at different respective CE modes, each paging signal defining a respective communications resource for use by the terminal device.

20. A base station according to clause 13, in which the communications resource comprises at least a transmission time slot defining a subframe amongst plural consecutive subframes, the controller being configured to control the transceiver to receive the connection request message in the defined subframe and at least one temporally following subframe.

21. A base station according to clause 20, in which:
the base station is configured to selectively operate at multiple coverage enhancement (CE) modes for communication with the terminal device, each CE mode corresponding to a different respective number of repetitions of wireless data signals to or from the terminal device; and
the controller is configured to control the transceiver to receive the connection request message in the defined subframe and a number of temporally following subframes dependent upon the number of repetitions used in the CE mode applicable to communications from the terminal device.

22. A base station according to clause 21, in which the number of temporally following subframes is equal to the number of repetitions.

23. A base station according to claim 12, in which, for a terminal device from which the base station does not receive a connection request message in response to a paging signal directed to that terminal device, the controller is configured to follow a radio channel allocation procedure with that terminal device.

24. A wireless telecommunications system comprising a terminal device according to any one of clauses 1 to 11 and a base station according to any one of clauses 12 to 22.

25. A method of operation of a terminal device for use in a wireless telecommunications system and configured to perform wireless communication with a base station; the method comprising:
detecting a wireless paging signal from the base station;
detecting whether the paging signal comprises information defining an allocation of a communications resource for use by the terminal device to send a connection request message to the base station;
controlling the transceiver, in response to a detection that the paging signal does not comprise information defining the allocation of the communications resource, to perform a radio channel allocation procedure with the base station in order for the terminal device to be allocated the communications resource; and
controlling the transceiver to establish wireless communication with the base station by sending the connection request message using the allocated communications resource.

26. Computer software which, when executed by a computer, causes the computer to perform the method of clause 25.

27. A storage medium which stores computer software according to clause 26.

28. A method of operation base station for use in a wireless telecommunications system and configured to perform wireless communication with a terminal device; the method comprising:
sending a wireless paging signal to the terminal device, the paging signal comprising information defining an allocation of a communications resource for use by the terminal device to send a connection request message to the base station; and
establishing wireless communication with the terminal device by receiving the connection request message using the allocated communications resource.

29. Computer software which, when executed by a computer, causes the computer to perform the method of clause 28.

30. A storage medium which stores computer software according to clause 29.

The invention claimed is:
1. A terminal device for use in a wireless telecommunications system, the terminal device comprising:
a transceiver configured to perform wireless communication with a base station; and
circuitry configured to:
control the transceiver to detect a wireless paging signal from the base station;
detect whether the paging signal comprises information defining an allocation of a communications resource for use by the terminal device to send a connection request message to the base station;
control the transceiver, in response to a detection that the paging signal does not comprise information defining the allocation of the communications resource, to perform a radio channel allocation procedure with the base station in order for the terminal device to be allocated the communications resource; and
control the transceiver, in response to a detecting that the paging signal comprises information defining the allocation of the communications resource, to establish wireless communication with the base station by sending the connection request message using the allocated communications resource, wherein
when the circuitry detects that the base station has not acknowledged a connection request message sent in response to a paging signal directed to the terminal device, the circuitry is configured to follow a radio channel allocation procedure with the base station.

2. The terminal device according to claim 1, wherein the communications resource comprises one or more of:
one or more radio frequency bands;
a temporary radio network identifier; and
one or more transmission time slots.

3. The terminal device according to claim 1, wherein the paging signal comprises a data field defining the communications resource.

4. The terminal device according to claim 1, wherein the paging signal comprises a first portion and a second portion, the first portion comprising scheduling data scheduling the transmission of the second portion, the first portion comprising a data field defining the communications resource.

5. The terminal device according to claim 1, wherein the paging signal comprises a first portion and a second portion, the first portion comprising scheduling data scheduling the transmission of the second portion, the second portion comprising a data field defining the communications resource.

6. The terminal device according to claim 1, wherein the terminal device is configured to selectively operate at multiple coverage enhancement (CE) modes, each CE mode corresponding to a different respective number of repetitions of wireless data signals to or from the terminal device.

7. The terminal device according to claim 6, wherein the circuitry is configured to set a CE mode according to the CE mode of a detected paging signal.

8. The terminal device according to claim 6, wherein the terminal device is configured to:
perform wireless communication with the base station using the allocated communications resource by sending the connection request message using a predetermined CE mode; and
receive information from the base station, in response to the connection request message, indicating a required CE mode.

9. The terminal device according to claim 6, wherein the terminal device is configured to:
receive the paging signal using a predetermined CE mode; and
perform wireless communication using a CE mode associated with the terminal device.

10. The terminal device according to claim 1, wherein the terminal device is configured to selectively operate at multiple coverage enhancement (CE) modes, each CE mode corresponding to a different respective number of repetitions of wireless data signals to or from the terminal device,
the terminal device is configured to receive the paging signal using a predetermined CE mode, and perform wireless communication using a CE mode associated with the terminal device, and
the circuitry is configured to follow a radio channel allocation procedure using the CE mode at which the connection request message was sent.

11. A base station for use in a wireless telecommunications system, the base station comprising:
a transceiver configured to perform wireless communication with a terminal device; and
circuitry configured to:
control the transceiver to send a wireless paging signal to the terminal device, the paging signal comprising information defining an allocation of a communications resource for use by the terminal device to send a connection request message to the base station; and
control the transceiver to establish wireless communication with the terminal device by receiving the connection request message using the allocated communications resource, wherein
the base station is configured to selectively operate at multiple coverage enhancement (CE) modes for communication with the terminal device,
the circuitry is configured to control the transceiver to send multiple paging signals at different respective CE modes, and
each paging signal defines a respective communications resource for use by the terminal device.

12. The base station according to claim 11, wherein the communications resource comprises one or more of:
one or more radio frequency bands;
a temporary radio network identifier; and
one or more transmission time slots.

13. The base station according to claim 11, wherein the paging signal comprises a data field defining the communications resource.

14. The base station according to claim 11, wherein the paging signal comprises a first portion and a second portion, the first portion comprising scheduling data scheduling the transmission of the second portion, the first portion comprising a data field defining the communications resource.

15. The base station according to claim 11, wherein the paging signal comprises a first portion and a second portion, the first portion comprising scheduling data scheduling the transmission of the second portion, the second portion comprising a data field defining the communications resource.

16. The base station according to claim 11, wherein each CE mode corresponds to a different respective number of repetitions of wireless data signals to or from the terminal device.

17. The base station according to claim 16, wherein the base station is configured to:
receive the connection request message using a predetermined CE mode; and
send information to the terminal device that sent the connection request message, indicating a required CE mode.

18. A method of operation of a terminal device for use in a wireless telecommunications system and configured to perform wireless communication with a base station; the method comprising:
detecting a wireless paging signal from the base station;
detecting whether the paging signal comprises information defining an allocation of a communications resource for use by the terminal device to send a connection request message to the base station;
controlling the transceiver, in response to a detection that the paging signal does not comprise information defining the allocation of the communications resource, to perform a radio channel allocation procedure with the base station in order for the terminal device to be allocated the communications resource;
controlling the transceiver, in response to a detection that the paging signal comprises information defining the allocation of the communications resource, to establish wireless communication with the base station by sending the connection request message using the allocated communications resource; and
following a radio channel allocation procedure with the base station when it is determined that that the base station has not acknowledged a connection request message sent in response to a paging signal directed to the terminal device.

* * * * *